US007764709B2

(12) United States Patent
Tran et al.

(10) Patent No.: US 7,764,709 B2
(45) Date of Patent: Jul. 27, 2010

(54) PRIORITIZATION OF NETWORK TRAFFIC

(76) Inventors: Hieu T. Tran, 3830 NW. Tustin Ranch Dr., Portland, OR (US) 97229; Dinesh Kumar, 16878 NW. Desert Canyon Dr., Beaverton, OR (US) 97006; Kiran A. Patil, 16805 NW. Oak Creek Dr., Beaverton, OR (US) 97006; Linden Cornett, 2981 SW. Fairview Blvd., Portland, OR (US) 97205

( * ) Notice: Subject to any disclaimer, the term of this patent is extended or adjusted under 35 U.S.C. 154(b) by 1784 days.

(21) Appl. No.: 10/885,821

(22) Filed: Jul. 7, 2004

(65) Prior Publication Data

US 2006/0007855 A1 Jan. 12, 2006

(51) Int. Cl.
*H04J 3/00* (2006.01)
(52) U.S. Cl. ............... 370/469; 370/230; 370/235; 370/490
(58) Field of Classification Search ............ 370/229; 709/230
See application file for complete search history.

(56) References Cited

U.S. PATENT DOCUMENTS

| | | | | |
|---|---|---|---|---|
| 6,574,748 B1* | 6/2003 | Andress et al. | ............... | 714/11 |
| 6,772,189 B1* | 8/2004 | Asselin | ............... | 718/100 |
| 6,938,092 B2* | 8/2005 | Burns | ............... | 709/230 |
| 7,219,121 B2* | 5/2007 | Kaniyar et al. | ............... | 709/201 |
| 7,549,005 B1* | 6/2009 | Pandhare et al. | ............ | 710/262 |
| 2001/0037406 A1* | 11/2001 | Philbrick et al. | ............ | 709/250 |
| 2002/0144004 A1* | 10/2002 | Gaur et al. | ............... | 709/310 |
| 2003/0046511 A1* | 3/2003 | Buch et al. | ............... | 712/1 |
| 2003/0158906 A1* | 8/2003 | Hayes | ............... | 709/211 |
| 2004/0042483 A1* | 3/2004 | Elzur et al. | ............... | 370/463 |
| 2004/0044798 A1* | 3/2004 | Elzur et al. | ............... | 709/250 |
| 2004/0054814 A1* | 3/2004 | McDaniel | ............... | 709/250 |
| 2005/0083960 A1* | 4/2005 | Gutierrez et al. | ............ | 370/428 |
| 2005/0135412 A1* | 6/2005 | Fan | ............... | 370/463 |
| 2005/0149632 A1* | 7/2005 | Minami et al. | ............... | 709/237 |
| 2005/0165938 A1* | 7/2005 | Cornett | ............... | 709/229 |
| 2005/0188074 A1* | 8/2005 | Voruganti et al. | ............ | 709/224 |
| 2005/0216597 A1* | 9/2005 | Shah et al. | ............... | 709/230 |
| 2005/0228851 A1* | 10/2005 | Cornett | ............... | 709/200 |
| 2005/0246450 A1* | 11/2005 | Enko et al. | ............... | 709/230 |
| 2006/0268859 A1* | 11/2006 | Smith | ............... | 370/389 |
| 2006/0274788 A1* | 12/2006 | Pong | ............... | 370/469 |

OTHER PUBLICATIONS

Postel, J., ed., "Transmission Control Protocol:: DARPA Internet Program Protocol Specification," Information Sciences Institute, RFC: 793, Sep. 1981; 88 pp.

* cited by examiner

*Primary Examiner*—Ricky Ngo
*Assistant Examiner*—Dewanda Samuel
(74) *Attorney, Agent, or Firm*—Blakely, Sokoloff, Taylor & Zafman LLP (57) ABSTRACT

A plurality of packets associated with a plurality of protocols are received, wherein the plurality of packets are to be processed by a plurality of processors. Packets associated with a first protocol are sent to be processed by at least one of the plurality of processors before sending packets associated with a second protocol to be processed, in response to determining that the packets associated with the first protocol have a higher priority for processing than the packets associated with the first protocol.

17 Claims, 6 Drawing Sheets

PRIORITIZATION OF NETWORK TRAFFIC

BACKGROUND

Receive side scaling (RSS) is a feature in an operating system that allows network adapters that support RSS to direct packets of certain Transmission Control Protocol/Internet Protocol (TCP/IP) flow to be processed on a designated Central Processing Unit (CPU), thus increasing network processing power on computing platforms that have a plurality of processors. Further details of the TCP/IP protocol are described in the publication entitled "Transmission Control Protocol: DARPA Internet Program Protocol Specification," prepared for the Defense Advanced Projects Research Agency (RFC 793, published September 1981). The RSS feature scales the received traffic across the plurality of processors in order to avoid limiting the receive bandwidth to the processing capabilities of a single processor.

In order to direct packets to the appropriate CPU, a hash function is defined that takes as an input the header information included in the flow, and outputs a hash value used to identify the CPU on which the flow should be processed by a device driver and the TCP/IP stack. The hash function is run across the connection-specific information in each incoming packet header. Based on the hash value, each packet is assigned to a certain bucket in a redirection table. There are a fixed number of buckets in the redirection table and each bucket can point to a specific processor. The contents of the redirection table are pushed down from the host stack. In response to an incoming packet being classified to a certain bucket, the incoming packet can be directed to the processor associated with that bucket.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
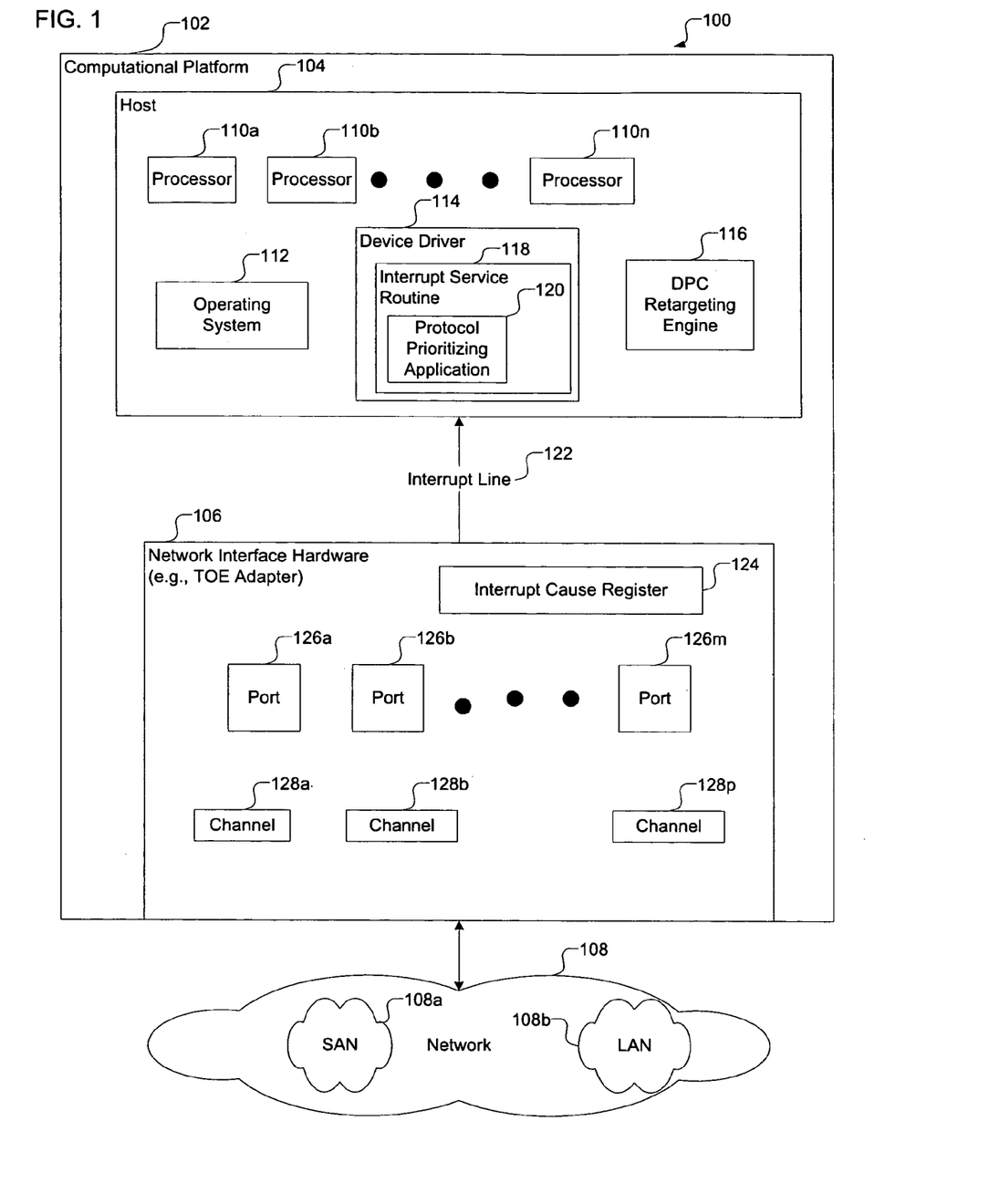
FIG. 1 illustrates a computing environment, in accordance with certain embodiments.

FIG. 1 illustrates a computing environment 100, in accordance with certain embodiments. A computational platform 102, comprising a host 104 and a network interface hardware 106, is coupled to a network 108 via the network interface hardware 106. The computational platform 102 may send and receive packets from other devices (not shown) through the network 108. In certain embodiments, packets may comprise data that is transmitted over the network 108.

The host 104 may comprise a personal computer, a workstation, a server, a mainframe, a hand held computer, a palm top computer, a laptop computer, a telephony device, a network computer, a blade computer, or any other computing device. The network interface hardware 106 may send and receive packets over the network 108. In certain embodiments the network interface hardware 106 may include a network adapter, such as, a TCP/IP offload engine (TOE) adapter. The network 108 may comprise the Internet, an intranet, a Local area network (LAN), a Storage area network (SAN), a Wide area network (WAN), a wireless network, etc. For example, in certain embodiments the network 108 may comprise a SAN 108a and a LAN 108b. In such embodiments, the network interface hardware 106 may receive both SAN traffic and LAN traffic, i.e., packets arriving at the network interface hardware 106 may be part of SAN traffic or LAN traffic. In certain additional embodiments, the network 108 may be part of one or more larger networks or may be an independent network or may be comprised of multiple interconnected networks.

In certain embodiments, the host 104 may comprise a plurality of processors 110a ... 110n, an operating system 112, a device driver 114, and a deferred procedure call (DPC) retargeting engine 116.

The plurality of processors 110n ... 110n may comprise Complex Instruction Set Computer (CISC) or Reduced Instruction Set Computer (RISC) processors or any other processor. The Operating system 112 may comprise the MICROSOFT WINDOWS* operating system, or any other operating system that is capable of supporting RSS. The device driver 114 may be a device driver for the network interface hardware 106. For example, in certain embodiments if the network interface hardware 106 is a network adapter then the device driver 114 may be a device driver for the network adapter. The DPC retargeting engine 116 may be an application that is capable of retargeting a DPC management object to a selected processor among the plurality of processors 110a ... 110n, where the selection of the processor may be based on the processing load on the plurality of processors 110a ... 110n. While FIG. 1 shows the DPC retargeting engine 116 outside the device driver 114, in certain embodiments the DPC retargeting engine 116 may be a part of the device driver 114.

*MICROSOFT WINDOWS is a registered trademark of Microsoft Corp.

The device driver 114 may comprise an interrupt service routine 118 that includes a protocol prioritizing application 120, where a protocol may indicate a format for transmitting data between two or more devices. The interrupt service routine 118 is capable of receiving interrupts from the network interface hardware 106 across an interrupt line 122, where in certain embodiments there may be only a single interrupt line 122. If there is only a single interrupt line 122, then the network interface hardware 106 may generate one interrupt as a result of a plurality of different types of network operations. For example, the network interface hardware 106 may generate one interrupt as a result of either or both of a plurality of LAN and SAN operations. In certain embodiments, for moderating the number of interrupts to the host 104, the network interface hardware 106 may generate an interrupt after a plurality of packets have accumulated at the network interface hardware 106 and are awaiting processing. The protocol prioritizing application 120 may provide a higher priority for processing traffic of a certain protocol over traffic of other protocols. For example, in certain embodiments the protocol prioritizing application 120 may provide a higher priority for processing SAN traffic over LAN traffic.

The network interface hardware 106 may include an interrupt cause register 124, a plurality of ports 126a . . . 126m and a plurality of channels 128a . . . 128p, where the channels 128a . . . 128p are used to interface the device driver 114 to the network interface hardware 106. In certain embodiments, the interrupt cause register 124 may be a 32-bit register whose individual bits indicate different causes of interrupt, such as, interrupts caused by a link status change or by individual channel operations.

The network interface hardware 106 can support a plurality of network protocols over the ports 126a . . . 126m. For example, in certain embodiments the port 126a may be dedicated to the processing of SAN network traffic and the port 126b may be dedicated to the processing of LAN network traffic. The channels 128a . . . 128p are mapped to the ports 126a . . . 126m. In certain embodiments, the device driver 114 configures the channels 128a . . . 128p for different network traffic types and processes the network traffic on each channel in an order of predefined or programmable priority.

In certain embodiments, the network interface hardware 106 receives a plurality of packets belonging to a plurality of network protocols. The protocol prioritizing application 120 and the DPC retargeting engine 116 may provide a higher priority to packets of certain types of network protocol for processing in the plurality of processors 110a . . . 110n. Additionally, the protocol prioritizing application 120 and the DPC retargeting engine 116 maintain the priority of certain types of network traffic processing while at the same time attempt to balance the processing load among the plurality of processors 110a . . . 110n.

Figure 2:
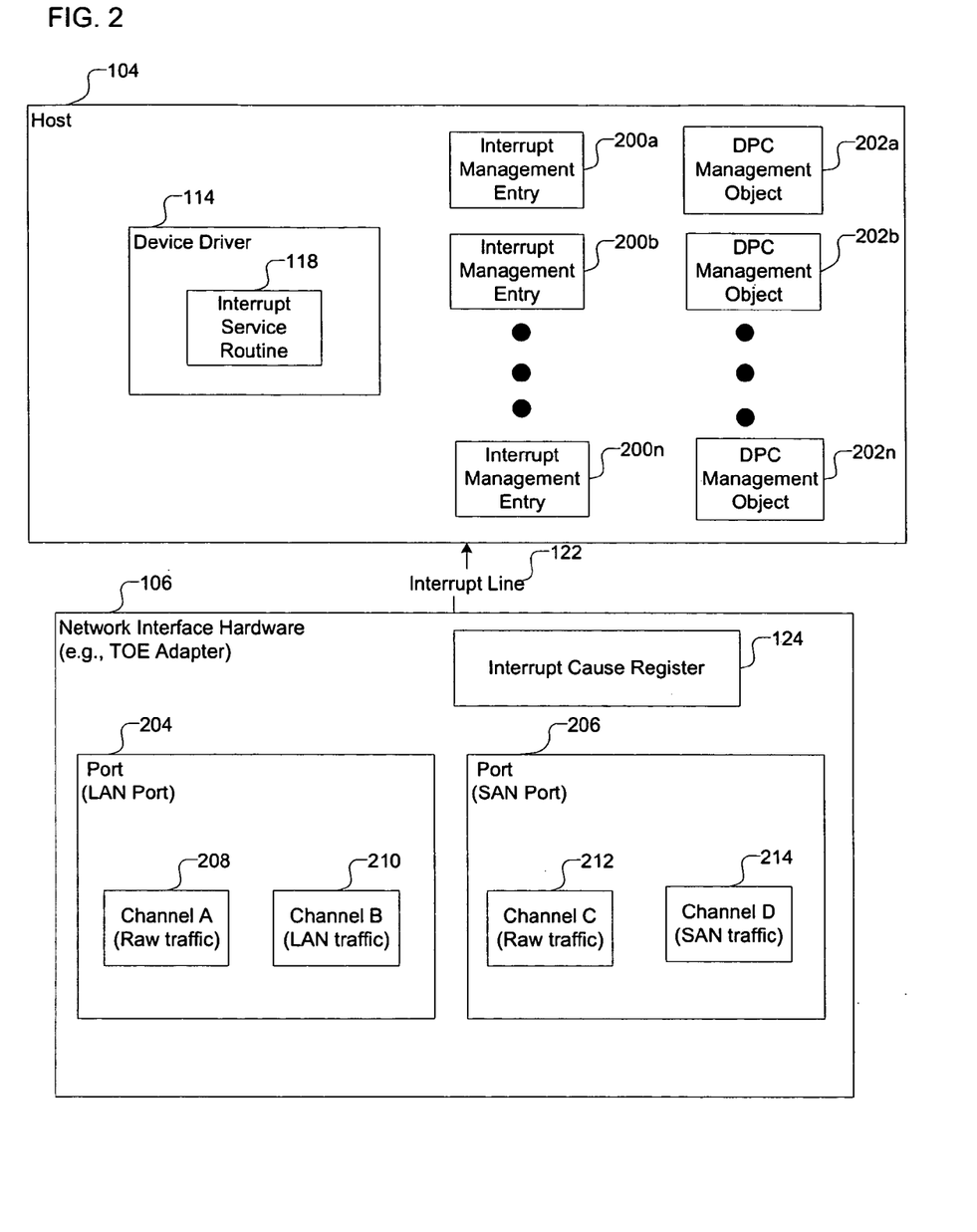
FIG. 2 illustrates a block diagram that shows interrupt handling in the computing environment, in accordance with certain embodiments.

FIG. 2 illustrates a block diagram that shows interrupt handling by the device driver 114 implemented in the host 104 of the computing environment 100, in accordance with certain exemplary embodiments.

Associated with the device driver 114 in the host 104 are a plurality of interrupt management entries 200a . . . 200n and a plurality of DPC management objects 202a . . . 202n, where a DPC management object may comprise one or more DPC objects. A DPC object is an operating system data structure that may be used to schedule or execute DPCs, where a DPC is a procedure call that has been deferred, i.e., delayed. In certain embodiments, the interrupt management entries 200a . . . 200n are data structures implemented in the device driver. In certain embodiments, when the network interface hardware 106 generates an interrupt, the interrupt service routine 118 of the device driver 114 claims the interrupt and determines the cause of the interrupt by reading the interrupt cause register 124 of the network interface hardware 106. The interrupt service routine 118 then schedules one or more of the DPC management objects 202a . . . 202n directed at the plurality of processors 110a . . . 110n. The DPC management objects 202a . . . 202n when started by the interrupt service routine 118 processes input/output (I/O) operations for the network interface hardware 106.

In certain exemplary embodiments, the number of DPC management objects is at most four or the number of active processors 110a . . . 110n, whichever is lower. For example, if the number of active processors is two then two DPC management objects may be used, where one DPC management object is associated with each port. In certain other embodiments, if the number of active processors are four or higher, then four DPC management objects may be used, where one DPC management object is used for each of four channels.

In certain exemplary embodiments, the network interface hardware 106 may include two ports 204, 206, where port 204 handles LAN traffic and port 206 handles SAN traffic. In certain embodiments, the port 204 that handles LAN traffic may include two channels, channel A 208 for handling raw traffic and channel B 210 for handling LAN traffic. Additionally, the port 206 that handles SAN traffic may include two channels, channel C 212 for handling raw traffic and channel D 214 for handling SAN traffic. In certain embodiments, Channels A, B, C, D 208, 210, 212, 214 are exemplary embodiments of channel 128a . . . 128p and the ports 204, 206 are exemplary embodiments of ports 126a . . . 126m. Additionally, in certain embodiments where the network interface hardware 116 is a TOE adapter, the raw traffic may include non-offloaded network traffic. In certain embodiments, the raw traffic does not include any control information to indicate the protocol of the raw traffic.

FIG. 2 illustrates an embodiment in which the interrupt service routine 118 receives interrupts from the network interface hardware 106 across the single interrupt line 122. The interrupt service routine 118 determines the cause of the interrupt by reading the interrupt cause register 124. Based on the cause of the interrupt, the interrupt service routine may generate one or more DPC management objects 202a . . . 202n directed at the processors 110a . . . 110n. In certain embodiments, the interrupt management entries 200a . . . 200n may be ordered in accordance with certain priorities. For example, in certain embodiments the interrupt management entry 200a may have a higher priority than interrupt management entry 200b.

Figure 3:
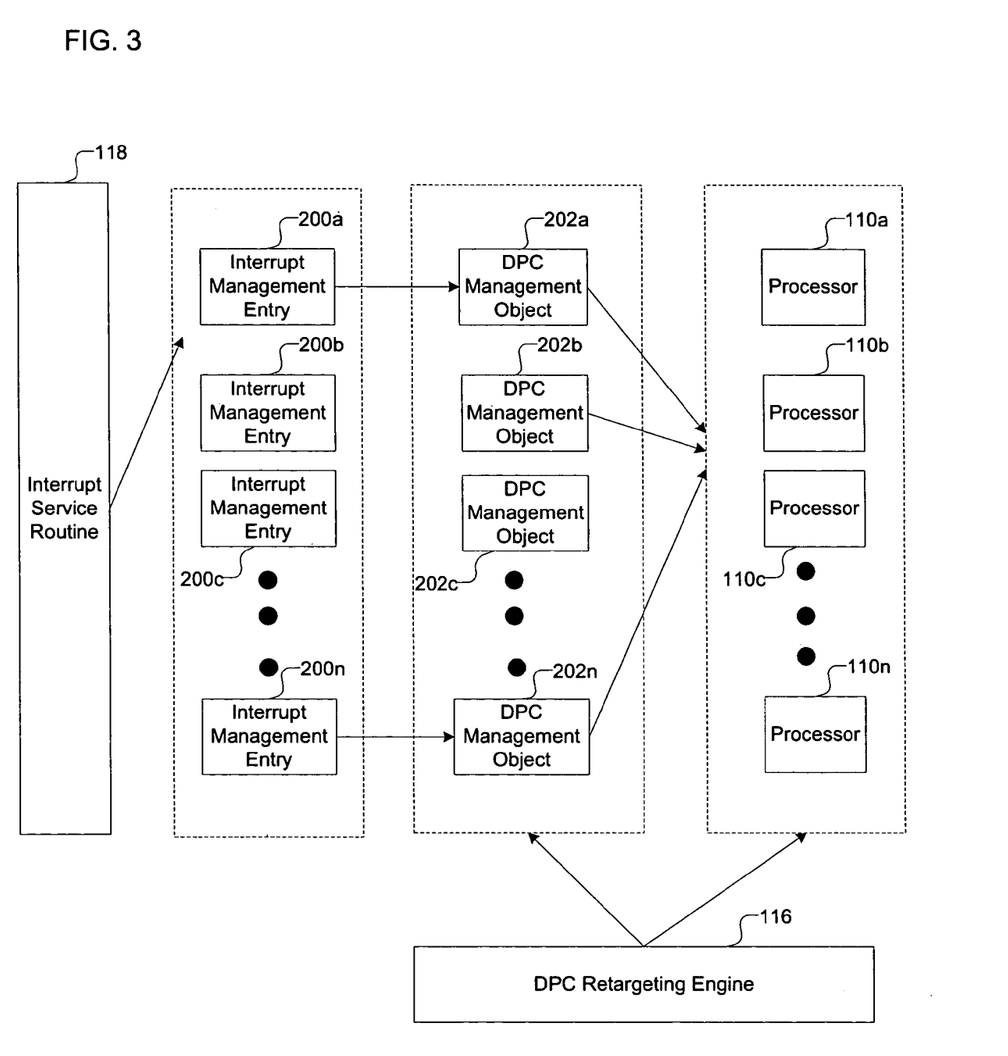
FIG. 3 illustrates a block diagram that shows how an interrupt service routine and a retargeting engine map packets to processors, in accordance with certain embodiments.

FIG. 3 illustrates a block diagram that shows how the interrupt service routine 118 and the DPC retargeting engine 116 map packets to the processors 110a . . . 110n, in accordance with certain embodiments.

The interrupt service routine 118 when called reads the interrupt cause register 124 and iterates through the interrupt management entries 200a . . . 200n. Based on the iteration through the interrupt management entries 200a . . . 200n, the interrupt service routine may schedule one or more DPC management objects to the processors 110a . . . 110n.

In a multi-processor environment the operating system 112 may dedicate the processors 110a . . . 110n to different tasks causing different processors to have different processing loads, i.e., one processor may be busier than the others. In certain embodiments, each DPC management object may be targeted to a different processor. For example, in certain exemplary embodiments the interrupt service routine 118 may target DPC management object 202a to processor 110b. A DPC management object, when targeted to a processor will run only on that processor. In certain embodiments, the device driver 114 notifies the operating system 112 the priorities for DPC management objects 202a . . . 202n. For example, in certain embodiments DPC management object 202a may correspond to the raw traffic on channel C 212, DPC management object 202b may correspond to the SAN traffic on channel D 214, DPC management object 202c may correspond to the raw traffic on channel A 208 and DPC management object 202n may correspond to the LAN traffic on channel B 210. In certain embodiments the raw traffic on channel C 212 of the SAN port 206 has the highest priority, followed by the SAN traffic on channel D 214 of the SAN port 206, followed by raw traffic on channel A 208 of the LAN port 204, followed by LAN traffic on channel B 210 of the LAN port 204. In such a case, the highest priority DPC management object is DPC management object 202a, followed by DPC management object 202b, followed by DPC management object 202c, followed by DPC management object 202n. In certain embodiments, the operating system 112 starts the higher priority DPC management objects before lower priority DPC management objects for processing on the processors 110a . . . 110n.

The processing load on the processor 110a . . . 110n may change over time. The device driver 114, the DPC retargeting engine 116, and the DPC management objects 202a . . . 202n may keep track of load statistics for each processor 110a . . . 110n in the host 104, where the load statistics for a processor may indicate the processing load on the processor. Periodically, the device driver 114 may assess load statistics on each processor and determine whether any DPC management object may need to be retargeted to a different processor. Load statistics for each processor may be tracked in various ways. For example, in certain embodiments an indicator for computing the load statistics may include the time difference between the time a DPC is scheduled and the time when the DPC is started. The period of time over which load statistics are collected can be adjusted to cover sufficient information to assess the loading of processors based on processor speed, processor features, or number of processors.

If a retargeting of DPC management objects becomes necessary, the device driver 114 retargets the DPC management objects, such that, DPC management objects with higher priorities are retargeted to the processors that are less loaded. For example, in certain embodiments, the highest priority DPC management object is retargeted to the least busy processor. In certain embodiments, the device driver 114 retargets the DPC management objects only when necessary. Furthermore, it may not be necessary to retarget all DPC management objects as long as I/O prioritization requirements are being satisfied.

In addition, in certain embodiments a synchronization mechanism may synchronize the retargeting operations and interrupt handling operations. The retargeting operations may be performed at the same interrupt request level as the interrupt service routine 118 by using a mechanism provided by the operating system 112 to synchronize a thread with the interrupt service routine 118. Furthermore, it is possible that a DPC management object is started on a different processor while the interrupt service routine 118 still runs on the current processor. The synchronization mechanism implemented by the device driver 114 may allow a DPC management object to execute safely even when the interrupt service routine 118 of the device driver 114 has not completed.

In certain embodiments, the retargeting operations are implemented in the DPC retargeting engine 116, where the retargeting engine 116 may be implemented either as part of the device driver 114 or outside the device driver 114.

Figure 4:
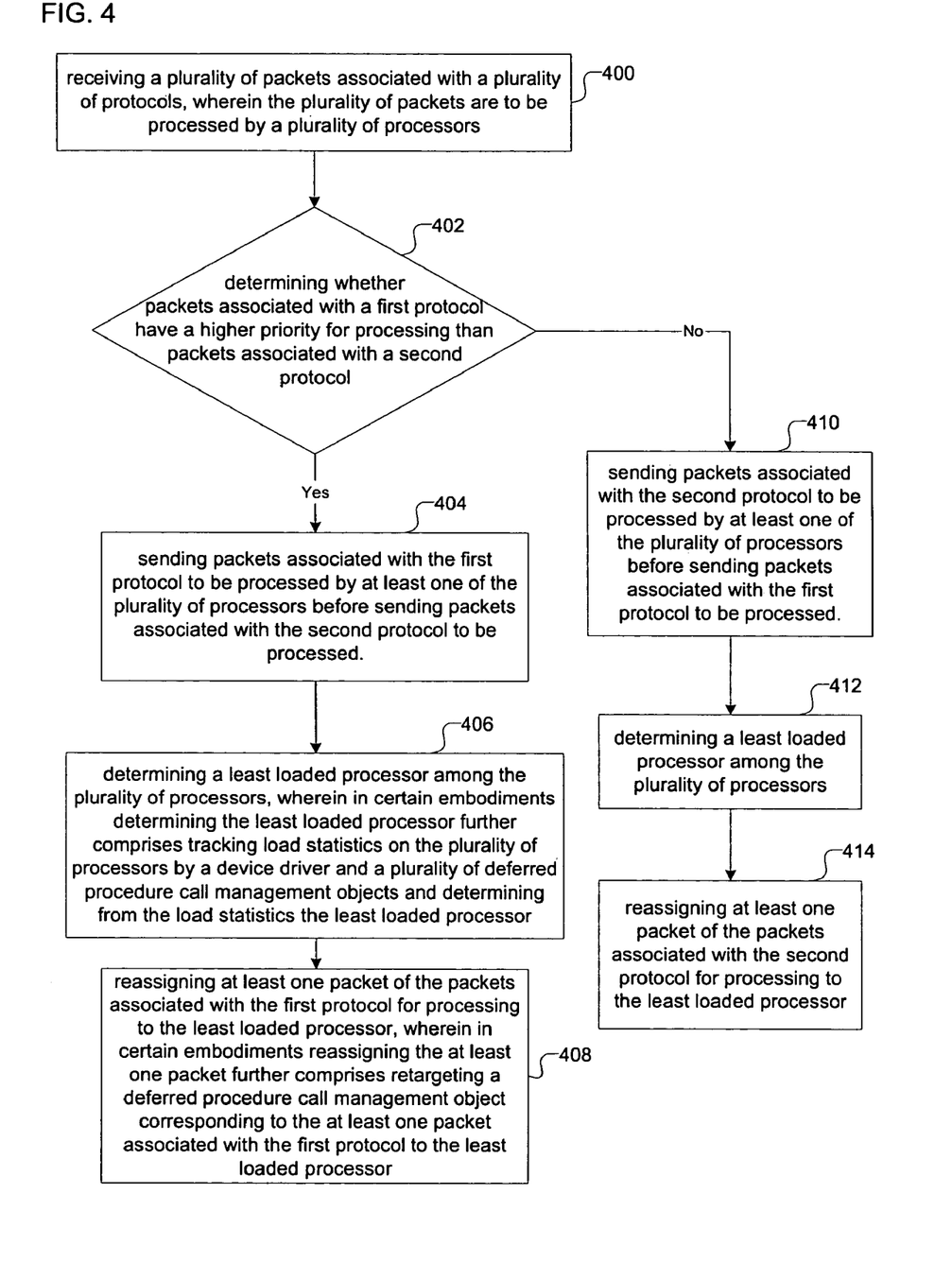
FIG. 4 illustrates first operations implemented in the interrupt service routine and the retargeting engine, in accordance with certain embodiments.

FIG. 4 illustrates first operations implemented in the interrupt service routine 118 and the DPC retargeting engine 118, in accordance with certain embodiments.

The process starts at block 440, where the device driver 114 receives a plurality of packets associated with a plurality of protocols, wherein the plurality of packets are to be processed by a plurality of processors 110a . . . 110n. The device driver determines (at block 402) whether packets associated with a first protocol, such as, a SAN protocol, have a higher priority for processing than packets associated with a second protocol, such as, a LAN protocol.

If the device driver 114 determines that packets associated with a first protocol have a higher priority for processing than packets associated with a second protocol, then the device driver 114 may send (at block 404) the packets associated with the first protocol to be processed by at least one of the plurality of processors 110a . . . 110n before sending packets associated with the second protocol to be processed. For example, in certain embodiments, the device driver 114 may send packets associated with the SAN protocol for processing at the processors 110a . . . 110n before sending packets associated with the LAN protocol.

The device driver 114 determines (at block 406) a least loaded processor among the plurality of processors 110a . . . 110n, wherein in certain embodiments determining the least loaded processor further comprises tracking load statistics on the plurality of processors 110a . . . 110n by the device driver 114 and a plurality of DPC management objects 202a . . . 202n and determining from the load statistics the least loaded processor.

The device driver reassigns (at block 408) at least one packet of the packets associated with the first protocol for processing to the processor that is least loaded, wherein in certain embodiments reassigning the at least one packet further comprises retargeting a DPC management object corresponding to the at least one packet associated with the first protocol to the processor that is least loaded. For example, in certain embodiments the device driver 114 may in association with the DPC retargeting engine 116 determine that processor 110b is least loaded and retarget the processing of SAN traffic from processor 110a to processor 110b.

If the device driver 114 determines (at block 402) that packets associated with a first protocol do not have a higher priority for processing than packets associated with a second protocol, then the device driver 114 may send (at block 410) the packets associated with the second protocol to be processed by at least one of the plurality of processors 110a . . . 110n before sending packets associated with the first protocol to be processed. The device driver 114 determines (at block 412) a least loaded processor among the plurality of processors 110a . . . 110n. The device driver 114 reassigns (at block 414) at least one packet of the packets associated with the second protocol for processing to the processor that is least loaded.

In certain embodiments, the plurality of packets are received by a network interface hardware 106 having a plurality of ports 126a . . . 126m and a plurality of channels 128a . . . 128p, wherein a port is associated with at least one channel, wherein a channel is used for communicating packets of one protocol to a host 104 to which the network interface hardware 106 is coupled, and wherein a single interrupt line 122 couples the network interface hardware 106 to the host 104.

In certain embodiments, the receiving is performed by a network interface hardware 106 coupled to a host 104, wherein sending the packets is performed by a device driver 114 implemented in the host 104, wherein the device driver 114 utilizes the plurality of processors 110a . . . 110n while maintaining different processing priorities for the plurality of packets associated with the plurality of protocols.

FIG. 4 describes an embodiment in which the device driver 114 prioritizes packets of certain protocols over others for processing in a plurality of processors, while at the same time dynamically retargeting DPC management objects corresponding to protocol types for processing, such that, no processor is likely to be overloaded. The sooner a DPC management object is scheduled for execution the sooner the DPC management object is likely to finish execution before other DPC management objects. However by scheduling a DPC management object first, the DPC management object is not guaranteed to finish execution before other DPC management objects, because the processor on which the DPC management object executes may be more busy than other processors. In such a case, by retargeting DPC management objects a higher priority is maintained for packets of network protocols that are to be processed before packets of other network protocols. In certain embodiments, retargeting of DPC management objects are performed on the basis of load statistics tracked on a plurality of processors.

Figure 5:
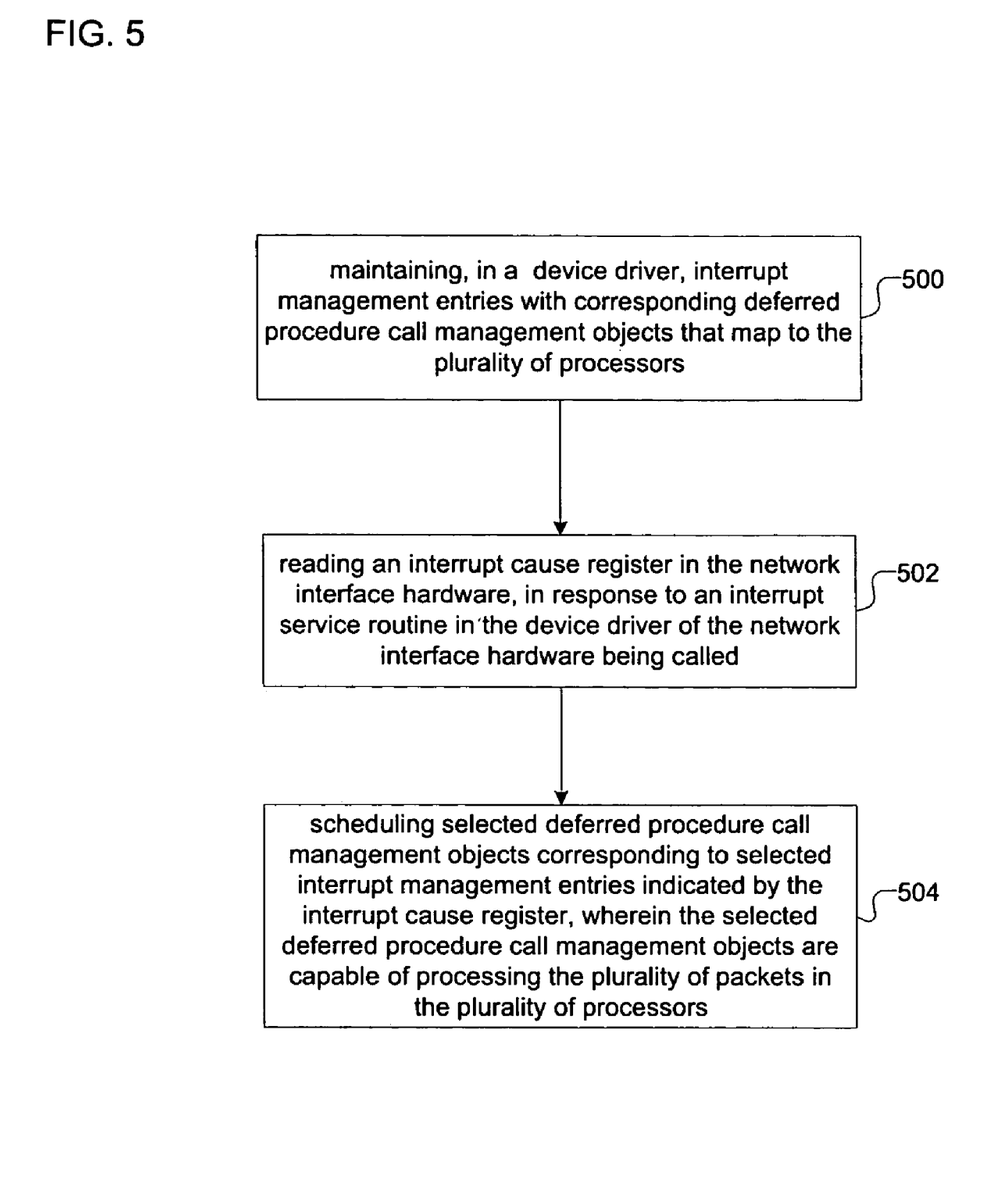
FIG. 5 illustrates second operations implemented in the interrupt service routine, in accordance with certain embodiments.

FIG. 5 illustrates second operations implemented in the device driver 114, in accordance with certain embodiments.

The process starts at block 500, where the device driver 114 maintains interrupt management entries 200a . . . 200n with corresponding DPC management objects 202a . . . 202n that map to the plurality of processors 110a . . . 110n.

The device driver 114 reads (at block 502) an interrupt cause register 124 in the network interface hardware 106, in response to an interrupt service routine 118 in the device driver 114 of the network interface hardware 106 being called. The device driver 114 schedules (at block 504) DPC management objects 202a . . . 202n corresponding to the interrupt management entries indicated by the interrupt cause register 124, where the DPC management objects are capable of processing the plurality of packets in the plurality of processors 110a . . . 110n.

For example, in certain exemplary embodiments, for each interrupt management entry 200a . . . 200n, the interrupt service routine 118 performs a logical AND of the interrupt cause register 124 with the interrupt management entry's bit mask, and schedules the DPC management object associated with the interrupt management entry if the logical AND operation results in a non-zero value. The interrupt service routine 118 may clear the bits in the interrupt cause register 124 that have been processed, and continue to iterate through an array of interrupt management entries until the value of the interrupt cause register 124 is zero. When the last interrupt management entry is processed the value of the interrupt cause register 124 is zero.

In certain embodiments, the hardware interrupt mechanism of the network interface hardware 106 may be disabled when the interrupt service routine 118 starts, such that, another interrupt does not occur while DPC management objects have not finished executing. Only the DPC management object that finishes last re-enables the hardware interrupt mechanism of the network interface hardware 106. In certain embodiments, the synchronization mechanism used for re-enabling interrupts is interlocked increment and decrement. For each DPC management object being scheduled, a counter is incremented using an interlocked increment mechanism. Each DPC management object that finishes executing, decrements the counter using an interlocked decrement mechanism. If the decremented value is zero, the corresponding DPC management object re-enables the hardware interrupt mechanism. If a DPC management object is completed before the interrupt service routine 118 has completed, the completed DPC management object does not try to re-enable the hardware interrupt mechanism. Instead, the completed DPC management object relies on the other DPC management objects or the interrupt service routine 118 to re-enable the hardware interrupt mechanism.

Certain embodiments may improve the performance of the network interface hardware 108 by using the plurality of processors 110a . . . 110n and providing the capability to handle prioritized network traffic in device driver 114. Additionally, the use of the interrupt management entries 200a . . . 220n can support one or more processors. 110a . . . 110n by setting the appropriated bits in the bit mask value of each interrupt management entry 200a . . . 200n.

The targeting of the DPC management objects 202a . . . 202n to different processors 110a . . . 110n dynamically and periodically based on the current load of each processor may ensure that higher priority network traffic is handled before lower priority network traffic. In certain embodiments, the ordering of DPC management objects in an interrupt management entry array corresponding the interrupt management entries 200a . . . 200n are not altered when retargeting operations are performed.

In certain embodiments, the operations for targeting of DPC management objects to processors are performed at the channel level by prioritizing the processing of receive and transmit operations based on the priority of the type of network traffic. Network traffic of protocols that are not based on the TCP/IP protocol may also be supported in certain embodiments.

Certain embodiments allow servicing of hardware interrupts on dual-port, TCP-offload capable network adapters with multiple channels supporting prioritized LAN and SAN network traffic in a multi-processor computing environment, where LAN traffic is supported in one port and SAN traffic is supported in the other port. Interrupt servicing is not restricted to a single processor when the host 104 includes a plurality of processors 110a . . . 110n. Certain embodiments may augment a device driver of a network interface hardware 106, such that the augmented device driver, e.g., device driver 114, is capable of using the plurality of processors 110a . . . 110n in the host 104 while at the same time maintaining the priority of network traffic processing.

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed. Furthermore, program logic that includes code may be implemented in hardware, software, firmware or many combination thereof.

Figure 6:
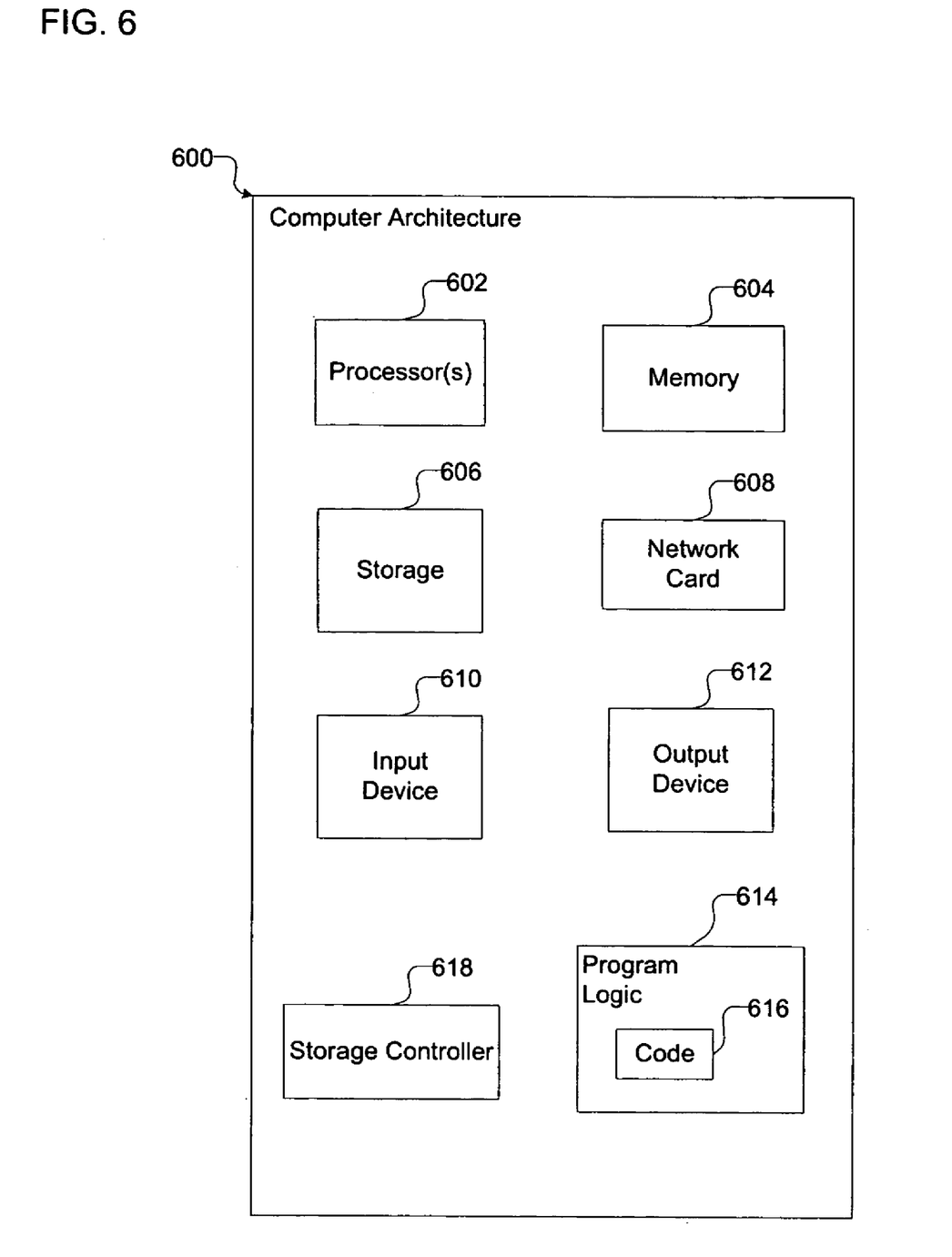
FIG. 6 illustrates a block diagram of a computer architecture for certain elements of the computing environment, in accordance with certain embodiments.

FIG. 6 illustrates a block diagram of a computer architecture in which certain embodiments are implemented. FIG. 6 illustrates one embodiment of the host 104 and the network interface hardware 106. The host 104 and the network interface hardware 106 may implement a computer architecture 600 having one or more processors 602, a memory 604 (e.g., a volatile memory device), and storage 606. Not all elements of the computer architecture 600 may be found in the host 104 and the network interface hardware 106. The storage 606 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 606 may comprise an internal storage device, an attached storage device and/or a network accessible storage device. Programs in the storage 606 may be loaded into the memory 604 and executed by the one or more processors 602 in a manner known in the art. The architecture may further include a network card 608 to enable communication with a network. The architecture may also include one input device 610, such as a keyboard, a touchscreen, a pen, voice-activated input, etc., and one output device 612, such as a display device, a speaker, a printer, etc. The computer architecture 600 may further include program logic 614 implemented via code 616, wherein the program logic 614 is capable of causing the processors 602 to be operable to perform various processing operations.

Certain embodiments may be implemented in a computer system including any storage controller 618 that manages access to a non-volatile storage device, such as a magnetic disk drive, tape media, optical disk, etc. Alternative embodiments may be implemented in a system that does not include a storage controller, such as, certain hubs and switches.

Certain embodiments may be implemented in a computer system including a video controller to render information to display on a monitor coupled to the computer system including the network interface hardware 106, where the computer system may comprise a desktop, workstation, server, mainframe, laptop, handheld computer, etc. An operating system may be capable of execution by the computer system, and the video controller may render graphics output via interactions with the operating system. Alternatively, some embodiments may be implemented in a computer system that does not include a video controller, such as a switch, router, etc. Furthermore, in certain embodiments the device may be included in a card coupled to a computer system or on a motherboard of a computer system.

At least certain of the operations of FIGS. 4 and 5 can be performed in parallel as well as sequentially. In alternative embodiments, certain of the operations may be performed in a different order, modified or removed. In alternative embodiments, the operations of FIGS. 4, and 5 may be implemented in the network interface hardware 106. Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-6 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   receiving a plurality of packets associated with a plurality of protocols, wherein the plurality of packets are to be processed by a plurality of processors;
   sending packets associated with a first protocol to be processed by at least one of the plurality of processors before sending packets associated with a second protocol to be processed, in response to determining that the packets associated with the first protocol have a higher priority for processing than the packets associated with the second protocol;
   determining a least loaded processor among the plurality of processors, wherein determining the least loaded processor includes tracking load statistics on the plurality of processors by a device driver and a plurality of deferred procedure call management objects, and determining from the load statistics the least loaded processor; and
   reassigning at least one packet of the packets associated with the first protocol to the least loaded processor, wherein reassigning the at least one packet further comprises retargeting a deferred procedure call management object corresponding to the packets associated with the first protocol to the least loaded processor.

2. The method of claim 1, wherein the first protocol is a storage area networking protocol, wherein the second protocol is a local area networking protocol.

3. The method of claim 1, wherein sending the packets further comprises:
   maintaining, in a device driver, interrupt management entries with corresponding deferred procedure call management objects that map to the plurality of processors;
   reading an interrupt cause register in a network interface hardware, in response to an interrupt service routine in the device driver of the network interface hardware being called; and
   scheduling selected deferred procedure call management objects corresponding to selected interrupt management entries indicated by the interrupt cause register, wherein the selected deferred procedure call management objects are capable of processing the plurality of packets in the plurality of processors.

4. The method of claim 1, wherein the plurality of packets are received by a network interface hardware having a plurality of ports and a plurality of channels, wherein a port is associated with at least one channel, wherein a channel is used for communicating packets of one protocol to a host to which the network interface hardware is coupled, and wherein a single interrupt line couples the network interface hardware to the host.

5. The method of claim 1, wherein receiving is performed by a network interface hardware coupled to a host, wherein sending the packets is performed by a device driver implemented in the host, and wherein the device driver utilizes the plurality of processors while maintaining different processing priorities for the plurality of packets associated with the plurality of protocols.

6. A system, comprising:
   a plurality of processors;
   a network interface hardware coupled to the plurality of processors;
   a device driver coupled to the plurality of processors; and
   a computer-readable storage medium coupled to the plurality of processors, wherein program logic including code is implemented in the computer-readable storage medium, and wherein the program logic including code causes the plurality of processors to be operable to
   receive a plurality of packets associated with a plurality of protocols, wherein the plurality of packets are to be processed by the plurality of processors,
   send packets associated with a first protocol to be processed by at least one of the plurality of processors before packets associated with a second protocol to be processed are sent, in response to a determination that the packets associated with the first protocol have a higher priority for processing than the packets associated with the second protocol, determine a least loaded processor among the plurality of processors, wherein determining a least loaded processor includes tracking load statistics on the plurality of processors by the device driver and a plurality of deferred procedure call management objects associated with the device driver and determining from the load statistics the least loaded processor, and reassign at least one packet of the packets associated with the first protocol to the least loaded processor, wherein the program logic including code further causes the plurality of processors to be operable to retarget a deferred procedure call management object corresponding to the packets associated with the first protocol to the least loaded processor.

7. The system of claim 6, wherein the first protocol is a storage area networking protocol, wherein the second protocol is a local area networking protocol.

8. The system of claim 6, further comprising:

a device driver of the network interface hardware, wherein the program logic including code further causes the plurality of processors to be operable to:

maintain, in the device driver, interrupt management entries with corresponding deferred procedure call management objects that map to the plurality of processors;

read an interrupt cause register in the network interface hardware, in response to an interrupt service routine in the device driver of the network interface hardware being called; and schedule selected deferred procedure call management objects corresponding to selected interrupt management entries indicated by the interrupt cause register, wherein the selected deferred procedure call management objects are capable of processing the plurality of packets in the plurality of processors.

9. The system of claim 6, wherein the plurality of packets are received by the network interface hardware having a plurality of ports and a plurality of channels, wherein a port is associated with at least one channel, wherein a channel is capable of being used to communicate packets of one protocol to the plurality of processors to which the network interface hardware is coupled, and wherein a single interrupt line couples the network interface hardware to the plurality of processors.

10. The system of claim 6, wherein the network interface hardware is capable of being configured to receive the packets, wherein a device driver of the network interface hardware is capable of being configured to send the packets, and wherein the device driver is capable of being configured to utilize the plurality of processors while maintaining different processing priorities for the plurality of packets associated with the plurality of protocols.

11. A system, comprising:

a host;

a storage controller implemented in the host;

a plurality of processors coupled to the host;

a network interface hardware coupled to host; and a computer-readable storage medium coupled to the plurality of processors, wherein program logic including code is implemented in the computer-readable storage medium, and wherein the program logic including code causes the plurality of processors to be operable to:

receive a plurality of packets associated with a plurality of protocols, wherein the plurality of packets are to be processed by the plurality of processors; and send packets associated with a first protocol to be processed by at least one of the plurality of processors before packets associated with a second protocol to be processed are sent, in response to a determination that the packets associated with the first protocol have a higher priority for processing than the packets associated with the second protocol, wherein the program logic including code further causes the plurality of processors to be operable to:

(i) determine a least loaded processor among the plurality of processors; and (ii) reassign at least one packet of the packets associated with the first protocol to the least loaded processor, the system further comprising a device driver implemented in the host, wherein the program logic including code further causes the plurality of processors to be operable to:

(a) maintain, in the device driver, interrupt management entries with corresponding-deferred procedure call management objects that map to the plurality of processors;

(b) read an interrupt cause register in the network interface hardware, in response to an interrupt service routine in the device driver of the network interface hardware being called; and (c) schedule selected deferred procedure call management objects corresponding to selected interrupt management entries indicated by the interrupt cause register, wherein the selected deferred procedure call management objects are capable of processing the plurality of packets in the plurality of processors.

12. The system of claim 11, wherein the plurality of packets are received by the network interface hardware having a plurality of ports and a plurality of channels, wherein a port is associated with at least one channel, wherein a channel is capable of being used for communicating packets of one protocol to the host to which the network interface hardware is coupled, and wherein a single interrupt line couples the network interface hardware to the host.

13. A non-transitory computer readable-storage medium encoded with computer executable instructions, wherein the computer executable instructions are executed to:

receive a plurality of packets associated with a plurality of protocols, wherein the plurality of packets are to be processed by a plurality of processors;

send packets associated with a first protocol to be processed by at least one of the plurality of processors before packets associated with a second protocol to be processed are sent, in response to a determination that the packets associated with the first protocol have a higher priority for processing than the packets associated with the second protocol;

determine a least loaded processor among the plurality of processors, wherein determining the least loaded processor includes tracking load statistics on the plurality of processors by a device driver and a plurality of deferred procedure call management objects, and determining from the load statistics the least loaded processor; and reassign at least one packet of the packets associated with the first protocol to the least loaded processor, wherein the computer readable instructions are executed further to retarget a deferred procedure call management object corresponding to the packets associated with the first protocol to the least loaded processor.

14. The non-transitory computer-readable storage medium of claim 13, wherein the first protocol is a storage area networking protocol, wherein the second protocol is a local area networking protocol.

15. The non-transitory computer-readable storage medium of claim 13, wherein the instructions are further capable of being executed to:
  maintain, in a device driver, interrupt management entries with corresponding deferred procedure call management objects that map to the plurality of processors;
  read an interrupt cause register in a network interface hardware, in response to an interrupt service routine in the device driver of the network interface hardware being called; and
  schedule selected deferred procedure call management objects corresponding to selected interrupt management entries indicated by the interrupt cause register, wherein the selected deferred procedure call management objects are capable of processing the plurality of packets in the plurality of processors.

16. The non-transitory computer-readable storage medium of claim 13, wherein the plurality of packets are received by a network interface hardware having a plurality of ports and a plurality of channels, wherein a port is associated with at least one channel, wherein a channel is capable of being used for communicating packets of one protocol to a host to which the network interface hardware is coupled, and wherein a single interrupt line couples the network interface hardware to the host.

17. The non-transitory computer-readable storage medium of claim 13, wherein a network interface hardware coupled to a host is capable of being configured to receive the packets, wherein a device driver implemented in the host is capable of being configured to send the packets, and wherein the device driver is capable of being configured to utilize the plurality of processors while maintaining different processing priorities for the plurality of packets associated with the plurality of protocols.

* * * * *